(12) United States Patent
Beiler et al.

(10) Patent No.: US 12,552,444 B2
(45) Date of Patent: Feb. 17, 2026

(54) STEERING ASSEMBLY SYSTEM WITH SELF-CENTERING ASPECT

(71) Applicant: New Heights, LLC, Leola, PA (US)

(72) Inventors: Aaron Jay Beiler, Gap, PA (US); William Fisher, Paradise, PA (US); Raymond Beiler, New Holland, PA (US); Jeremiah Weaver, Narvon, PA (US)

(73) Assignee: New Heights, LLC, Leola, PA (US)

( * ) Notice: Subject to any disclaimer, the term of this patent is extended or adjusted under 35 U.S.C. 154(b) by 1009 days.

(21) Appl. No.: 17/550,232

(22) Filed: Dec. 14, 2021

(65) Prior Publication Data

US 2023/0182805 A1     Jun. 15, 2023

(51) Int. Cl.
  *B62D 3/14*     (2006.01)

(52) U.S. Cl.
  CPC ..................... *B62D 3/14* (2013.01)

(58) Field of Classification Search
  CPC .......... B62D 5/12; B62D 13/04; B62D 7/144; B62D 5/06; B62D 5/062; B62D 5/061; B62D 5/07
  See application file for complete search history.

(56) References Cited

U.S. PATENT DOCUMENTS 3,698,188 A * 10/1972 Jenvey .................... B62D 5/12
                                                  180/440

FOREIGN PATENT DOCUMENTS

| CN | 211474583 U | * | 9/2020 | |
|----|----|----|----|----|
| DE | 4220415 A1 | * | 12/1993 | ............... B62D 5/12 |
| DE | 19627893 C1 | * | 11/1997 | ............... B62D 5/12 |
| DE | 102010000012 A1 | * | 7/2011 | ............... B62D 13/06 |
| EP | 3061672 A1 | * | 8/2016 | ............... B62D 7/144 |
| EP | 3835177 A1 | * | 6/2021 | ............... B62D 13/04 |
| WO | WO-2010041926 A1 | * | 4/2010 | ............... B62D 5/12 |

OTHER PUBLICATIONS

Vozar, Steering Axle, Jul. 7, 2011, EPO, DE 102010000012 A1, Machine Translation of Description (Year: 2011).*
Jiang, Hydraulic Centring Oil Cylinder And Engineering Vehicle, Sep. 11, 2020, EPO, CN 211474583 U, Machine Translation of Description (Year: 2020).*

\* cited by examiner

*Primary Examiner* — Paul N Dickson
*Assistant Examiner* — Matthew D Lee
(74) *Attorney, Agent, or Firm* — Barley Snyder

(57) ABSTRACT

A steering assembly system is provided having a steering actuator comprising a double rod end cylinder having: a cylinder barrel having a length, a first end with a first cap, and a second end with a second cap, and a first, second and third fluid port, each respectively in fluid communication with a first, second, and third chamber; a piston rod having a first rod end and a second rod end with a length extending therebetween, and the first rod end extending through the first cap and the second rod end extending through the second cap of the cylinder barrel; a first piston having a first dimension and mechanically secured at a point along the length of the main piston rod; a second piston having a second dimension larger than the first dimension of the first piston, and main piston rod extending through at least the length of the barrel.

18 Claims, 10 Drawing Sheets

STEERING ASSEMBLY SYSTEM WITH SELF-CENTERING ASPECT

FIELD OF THE INVENTION

The invention relates to a steering assembly and, more particularly, to a steering assembly suitable for use on a vehicle, such as a self-propelled, tandem axle trailer and, more particularly, to a steering assembly capable of being selectively actuated over a range of travel to provide steering articulation to an axle, or selectively entering into a self-centering steering position, and further, may be mechanically locked in a centered position while the assembly is not in use.

BACKGROUND

In various settings, directional steering of an axle of a vehicle can be controllably applied using a linear actuator to allow precise positioning of the vehicle in navigating along any variety of terrain, such as roadway, or unprepared surfaces. Such vehicles may need to navigate turns or steer around obstacles. These vehicles may be, for example, agricultural or construction vehicles. It has been previously known to utilize a trailerable vehicle that can be configured into a self-propelled vehicle having one or both axles of the trailer having directional steering of the wheels.

Where the vehicle is a reconfigurable trailer that is utilized for providing materials for replacement of a building roof, the vehicle may utilized to lift building materials and position them on a roof, or to collect the material that can be thrown directly into a container of the vehicle. There remains the problems of getting the vehicle and container in proximity to the roof and removal from the work site. The most common solution to the disposal problem is to move a dump truck adjacent to the building and to attempt to throw the material directly from the roof into the truck bin. Furthermore, the problem is not limited to roofing material. Any building remodeling generates significant construction trash, and the most convenient method of removing it from the building is to throw it out a window.

As a result, it is not always possible to move a large truck into a location adjacent to a building. Fences, lawns, and shrubs can be damaged by any size truck, especially a large transport truck.

There is a need for a vehicle that can move around prepared and unprepared surfaces, such as the typical landscaped yard surrounding a building, and utilize directional steering to facilitate positioning of the vehicle near workers and in a usable position, and that is study enough to handle large loads. Such a vehicle should be capable of providing both directional steering of one or more axles, as well as being placed into a centered steering position for straight travel of the vehicle. Such a vehicle should be capable of mechanically maintaining the centered position of the axle, even when there linear actuator is not being selectively controlled, such as when being towed.

SUMMARY

In view of the foregoing, a steering assembly system for a vehicle is provided having at least one axle configured for providing directional steering by actuation of a linear actuator to direct the wheels of the axle through a range of steering angles. Such a linear actuator can be controllably deployed through a range of directional steering, and further can also be securely deployed into a self-centered orientation. The linear actuator may further be mechanically locked into the self-centered orientation, to maintain the self-centered orientation of the wheels of the axle, even when the linear actuator is not being controlled.

Such a vehicle may be a trailer for towing by a power vehicle and generally includes a frame and a tandem wheel assembly. The frame forms an undercarriage chassis which the tandem wheel assembly is positioned there under. The undercarriage chassis includes a rear wheel assembly, a front wheel assembly, and an extension assembly moving the front wheel assembly between trailing position and a self-propelled position where the rear wheel assembly and the front wheel assembly are positioned to equally support the undercarriage chassis.

In an exemplary embodiment, there is provided a steering actuator for providing directional steering control to the wheels of one or both axles, such as a linear actuator for a steering assembly system, which may be in the form of a double rod end cylinder having:

a cylinder barrel having a length, a first end with a first cap, and a second end with a second cap, and a first, second and third fluid port, each respectively in fluid communication with a first chamber, a second chamber, and a third chamber;

a main piston rod having a first rod end and a second rod end with a length extending therebetween, and the first rod end extending through the first cap and the second rod end extending through the second cap of the cylinder barrel;

a first piston having a first dimension and mechanically secured at a point along the length of the main piston rod; and a second piston having a second dimension larger than the first dimension of the first piston, and piston rod extending through at least the length of the cylinder barrel.

In an embodiment of the invention, the steering actuator may provide the second piston having a standoff collar mechanically secured to a face of the second piston, the standoff collar extending in a direction towards the first piston, and having a stop-end. In an embodiment, the cylinder barrel may have a first portion with a small interior diameter that is sized to fit the first piston, and the cylinder barrel further may have a second portion with a large diameter that is sized to fit the second piston, and a transition between the first portion and the second portion. The first portion may further provide a sleeve inserted within the cylinder barrel to provide the small interior diameter.

In an embodiment of the invention, the first piston may be configured to reciprocate within the first portion of the cylinder barrel, and the first piston separates the first chamber from the second chamber. The second piston may be configured to reciprocate within the second portion of the cylinder barrel, and the second piston separates the second chamber from the third chamber. The second piston may reciprocate between a steering mode position when the second piston is positioned adjacent to the second cap, and a self-centering mode position when the second piston is positioned adjacent to the transition between the first portion and the second portion of the cylinder barrel. In an embodiment, the second piston, while it is provided in the steering mode position, does not prevent the first piston from traveling through a full range of travel for the first piston. In an embodiment, the second piston, while it is provided in the self-centering position, positions the stop end of the standoff collar at a location that obstructs the first piston from traveling through the full range of travel for the first piston.

In an embodiment where the second piston is in the self-centering position and the first piston is placed against the stop end, the double rod end cylinder will be in a centered steering position.

In an embodiment, the first piston and the second piston may each have at least one seal capable of providing a fluid impermeable sliding junction with an internal surface of the cylinder barrel. In an embodiment, the first cap, the second cap and the second piston may each have at least one seal capable of providing a fluid impermeable sliding junction with an outside diameter of the main piston rod.

In an embodiment the steering actuator may provide a double rod end cylinder that is pressure actuated, and is selected from one of a hydraulic cylinder and a pneumatic cylinder. In an embodiment, the first rod end and the second rod end of the double rod end cylinder may each be mechanically secured to steering components of an axle. The steering components may be a steering knuckle, and the steering actuator provides directional steering for the axle of a vehicle.

In an embodiment, the steering actuator further has a source of fluid pressure, and valves to selective delivery fluid pressure to at least one of the first port, second port, and third ports. In an embodiment, the cylinder barrel may be mechanically secured to a vehicle, and the steering of the vehicle may be provided by movement of the piston rod, relative to the cylinder barrel.

BRIEF DESCRIPTION OF THE DRAWINGS

The invention is explained in greater detail below with reference to embodiments and the appended drawings of which.

DETAILED DESCRIPTION OF THE EMBODIMENT(S)

Figure 1A:
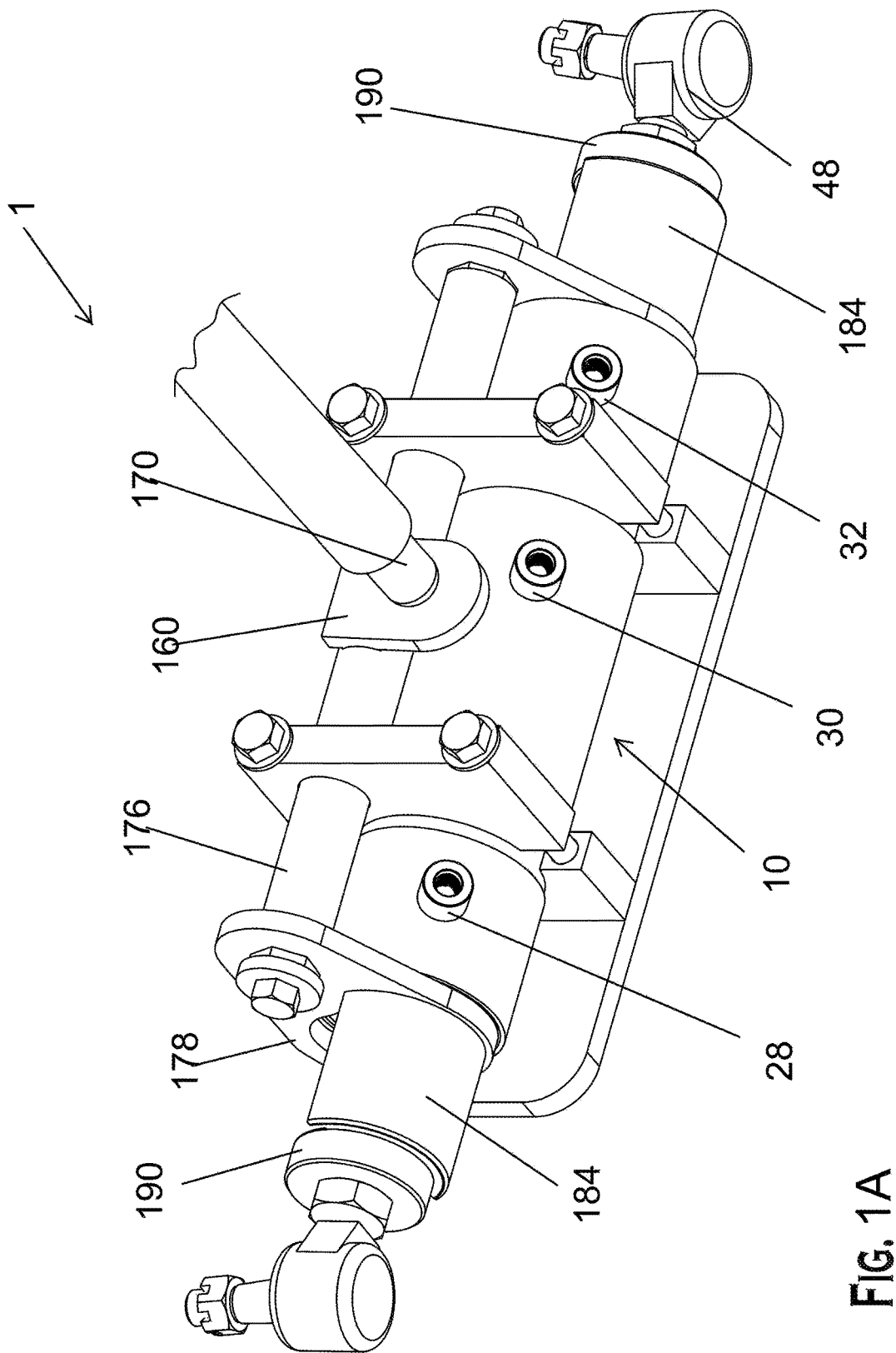
FIGS. 1A and 1B are perspective views of a steering assembly system according to the invention.

With respect to the FIGS. 1-10, aspects and components of an exemplary steering assembly system 1 according to the invention will be discussed. Such a steering assembly system may, for example, be utilized as part a self-powered vehicle, where there is a need to provide steering to at least one of the axles of the vehicle. The steering assembly system 1 provides a linear actuator 10 and generally includes the following major components: a cylinder barrel 20 having a plurality of ports, a piston rod 40, a first piston 60, a second piston 80, and a first and second cap 100, 110 at each end of the cylinder barrel. The steering assembly system may further provide a locking mechanism 150 that can be reversibly actuated to maintain the linear actuator in a centered position, without requiring the system to maintain pressure within the cylinder barrel.

Figure 1B:
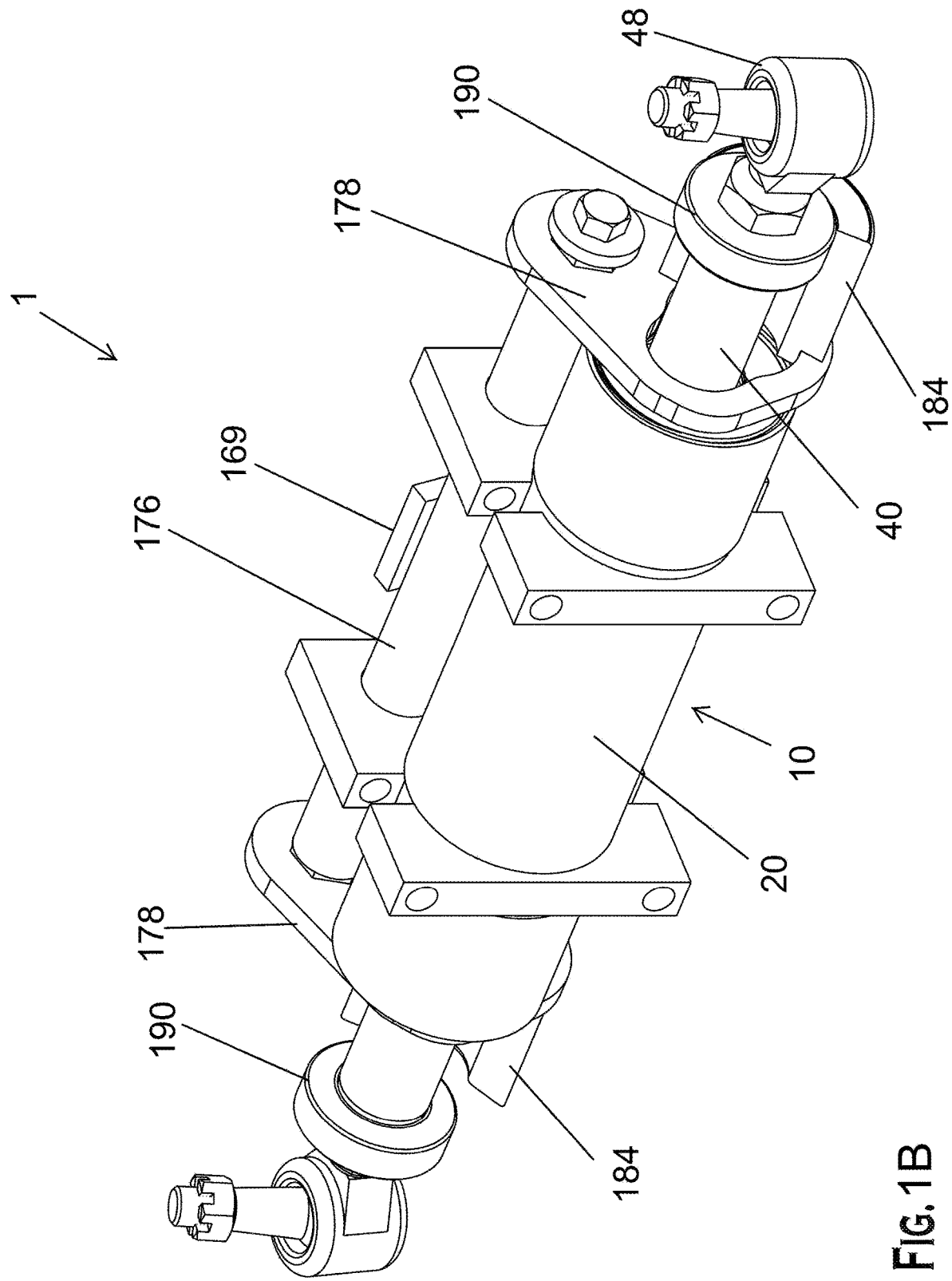

Now with reference to FIGS. 1A and 1B, the linear actuator 10 is depicted from opposing perspectives. The linear actuator as shown is a fluid pressure driven actuator, and will be described herein as a hydraulic cylinder, though it is contemplated that a pneumatic actuator would also function adequately, given adequate pressure differentials to actuate the components.

The hydraulic linear actuator 10 of the steering assembly system 1 will now be discussed. In an embodiment, the hydraulic actuator is a double rod end hydraulic actuator that utilizes fluid pressures varied within chambers in the cylinder barrel to control the movement of a first piston secured to a piston rod protruding from both ends of the cylinder barrel. The movement of the first piston may also be limited depending on the placement of the second cylinder within the cylinder barrel, as will be discussed. In a steering configuration, the first piston can be controllably placed over a full range of travel within a portion of the cylinder barrel, such as may be employed to effect the steering of the wheels for the axle. Where the second piston has been positioned to limit the movement of the first piston in a direction, and the first piston is at that limit, the hydraulic actuator is in a self-centering configuration, as the travel of the first piston in a direction will be halted at a point where the steering assembly system 1 will place the wheels of the vehicle for straight travel.

Figure 2:
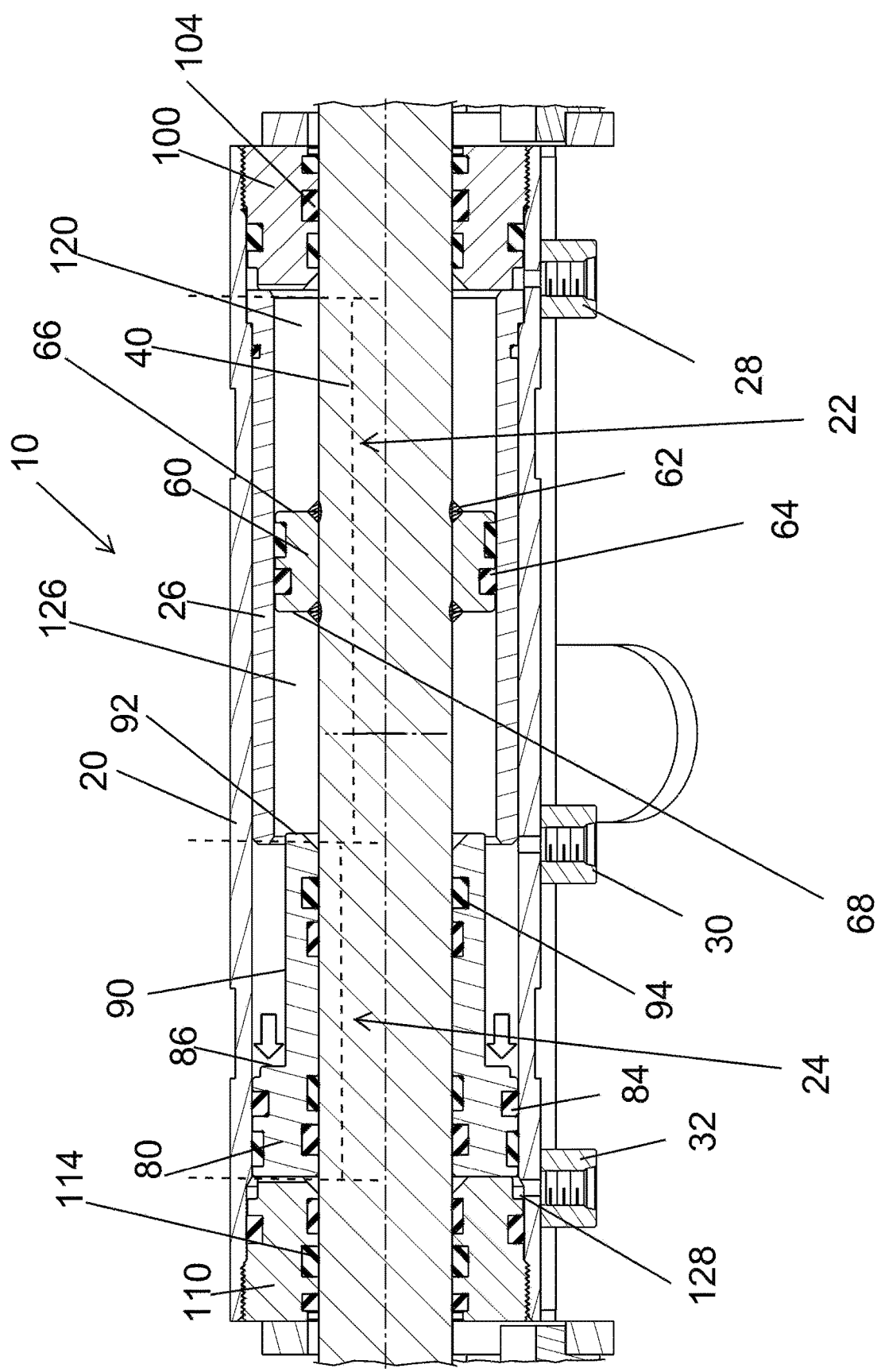
FIG. 2 is an enlarged cross-section view of a portion of the linear actuator of the steering assembly system of FIGS. 1A and B.

An embodiment of a hydraulically operated linear actuator 10 is depicted in FIG. 1, and in cross section in FIG. 2, having a cylinder barrel 20 provided in the form of a cylindrical rigid body that has an internal lumen passage 18 to accommodate the lateral movement of the first piston 60, the second piston 80, and the piston rod 40 therein. The internal lumen passage 18 of the cylinder barrel 20 has a larger inside diameter portion 24 that can accommodate the movement of the second piston 80. The internal lumen passage 18 also has a smaller inside diameter portion 22 that can accommodate the movement of the first piston 60. In an embodiment, the cylinder barrel is formed with the varying inside diameter portions as an integral unit, alternatively, it is contemplated that in order to create the reduced inside diameter portion 22, a sleeve 26 may be provided as an insert, and secured in place within the cylinder barrel 20, as depicted in FIG. 2.

The smaller inside diameter portion 22 of the cylinder barrel 20 extends from the inside face of the first cap 100 along the length of the cylinder barrel to the second port 30. Thus in the embodiment where a sleeve 26 is secured inside the cylinder barrel 20 to create the smaller inside diameter portion 22, as shown in FIG. 2, a first end of the sleeve 26 resides against the inside face of the first cap 100, and the other end of the sleeve 26 terminates at a point that is aligned with, or generally adjacent to the outlet for the second port 30. In an alternative embodiment, rather than providing a sleeve, the cylinder barrel may be formed with the smaller inside diameter portion 22 and the larger inside diameter portion 24 made integral with the cylinder barrel 20. In either embodiment, the smaller inside diameter portion 22 is sized to accommodate the first piston 60, and with first piston seals 64, creates a fluid impermeable sliding junction to allow the travel of the first piston 60 along substantially the length of the smaller inside diameter portion 22, and sleeve 26, if present.

The larger inside diameter portion 24 of the cylinder barrel 20 extends from the inside face of the second cap 110 along the length of the cylinder barrel 20 until the point where the internal lumen passage 18 transitions to the smaller inside diameter portion 22. The larger inside diameter portion 24 is sized to accommodate the second piston 80, and with the second piston seals 84, creates a fluid impermeable sliding junction to allow the travel of the second piston 80 along substantially the length of the larger inside diameter portion 24

At each end of the cylinder barrel 20, the internal lumen passage 18 is closed off by a first cap 100 and a second cap 110. The first cap 100 is located at a first end of the cylinder barrel 20, and effectively closes off the first end of the cylinder barrel 20. The first cap 100 is provided with an opening through which the first rod end 42 of the piston rod 40 may pass, and is provided with first cap seals 104 that seal to form a fluid impermeable sliding junction against the piston rod 40 as it is caused to reciprocate within the cylinder barrel 20, as will be discussed. The first cap 100 also is provided with a first cap seal 104 around the outside diameter of the first cap 100 to create a fluid impermeable junction where the first cap is secured to, or within, the cylinder barrel 20. The first cap 100 may be provided with at least one gap, or passages, provided on the inside face of the first cap 100 in order to allow fluid flow and pressure delivery to the inside face of the first cap 100, even when the first piston 60 is tightly positioned against the inside face of the first cap 100. The inside face of the first cap 100 will generally be aligned with the outlet for the first port 28. The first cap 100 may be threaded to engage corresponding threads provided in the interior of the cylinder barrel 20, or alternatively, the first cap may be secured by alternative fixation means, such as can be seen with reference to tie rod hydraulic cylinders utilizing fasteners secured to the exterior of the cylinder, as will be familiar to those of skill in the art.

The second cap 110 is located at a second end of the cylinder barrel 20, and effectively closes off the second end of the cylinder barrel 20. The second cap 110 is provided with an opening through which the second rod end 44 of the piston rod 40 may pass, and is provided with second cap seals 114 that seal to form a fluid impermeable sliding junction against the piston rod 40 as it is caused to reciprocate within the cylinder barrel 20, as will be discussed. The second cap 110 also is provided with a second cap seal 114 around the outside diameter of the second cap 110 to create a fluid impermeable junction where the second cap is secured to, or within, the cylinder barrel 20. The second cap 110 may be provided with at least one gap, or passages, provided on the inside face of the second cap 110 in order to allow fluid flow and pressure delivery to the inside face of the second cap 110, even when the second piston 80 is tightly positioned against the inside face of the second cap 110. The inside face of the second cap 110 will generally be aligned with the outlet for the third port 32. The second cap 110 may be threaded to engage corresponding threads provided in the interior of the cylinder barrel 20, or alternatively, the second cap may be secured by alternative fixation means, such as can be seen with reference to tie rod hydraulic cylinders utilizing fasteners secured to the exterior of the cylinder, as will be familiar to those of skill in the art.

As can be seen with reference to FIGS. 1A, 1B, and 2, the cylinder barrel 20 is provided with a plurality of fluid ports 28, 30, 32, through which pressurized fluid may pass through the ports to access at least a portion of the interior of the cylinder barrel 20.

Near the first end of the cylinder barrel 20, and near the first cap 100, there is provided a first port 28 that is in fluid communication with a first chamber within the interior of the cylinder barrel. The first port 28 allows for the passage of pressurized fluid in to, or out from, the interior of the cylinder barrel 20, typically through the sidewall of the cylinder barrel 20, though it is contemplated that the first port 28 may alternatively pass through the first cap to allow passage of pressurized fluid into, or out from the first chamber. The first port 28 may terminate at a point adjacent to or generally aligned with the inside of the face of the first cap 100, which may be provided with one or more channels or gaps (e.g., radial striations), to allow fluid flow past junction of the face of the first cap 100 with the end of the sleeve 26, thereby allowing fluid flow from the first port 28 to the interior dimension of the sleeve and into the first chamber 120, such that the fluid can act against the first face 66 of the first piston 60.

The second port 30 is positioned on the cylinder barrel 20 at a point away from the first and second ends of the cylinder barrel 20, and at a location that is aligned generally with the transition between the larger inside diameter portion 24 and the smaller inside diameter portion 22 of the cylinder barrel 20. This is typically closer to the midpoint than to the ends of the cylinder barrel 20, as depicted in FIG. 2, but can be varied based upon the dimensions of the cylinder utilized. The second port 30 is in fluid communication with a second chamber 126 within the interior of the cylinder barrel 20. The second port 30 allows for the passage of pressurized fluid into, or out from, the interior of the cylinder barrel 20, passing through the sidewall of the cylinder barrel. To accommodate the flow of fluid into, or out from, the second chamber, and through the second port 30. As can be seen with reference to FIG. 5, where the second piston 80 has been urged against sleeve 26, either or both of the second piston and/or the sleeve 26 may beneficially be provided with channels or gaps (e.g., radial striations) to allow the second chamber to remain in fluid communication with the second port 30, even though the piston is resting against the sleeve. In this manner, fluid may flow between the second port 30 to the interior dimension of the sleeve 26, and also encounter the second face 68 of the first piston 60, and further against the first face 86 of the second piston 80.

The third port 32 is positioned near to the second end of the cylinder barrel 20, and near the second cap 110. The third port 32 is in fluid communication with the third chamber 128 within the interior of the cylinder barrel 20. The third port 32 allows for the passage of pressurized fluid in to, or out from, the interior of the cylinder barrel 20, typically through the sidewall of the cylinder barrel 20, though it is contemplated that the third port 32 may alternatively pass through the second cap 110 to allow passage of pressurized fluid into, or out from the third chamber. The third port 32 may terminate at a point adjacent to or generally aligned with the inside of the face of the second cap 110, which may be provided with one or more channels or gaps, (e.g., radial striations) to allow fluid flow past junction of the face of the second cap 110 when the second face 88 of the second piston 80 is residing against the inner face of the second cap 110, thereby allowing fluid flow from the third port 32 to the interior dimension of the sleeve and into the third chamber 128, such that the fluid can act against the second face 88 of the second piston 80.

Each of the first, second and third ports 28, 30, 32 are configured to be releasably secured to a fluid conveying line in an impermeable manner, in any suitable manner, such as a threaded connection, as depicted in FIG. 2, or alternatively a quick release connection as will be familiar to those of skill in the art.

The system may also be provided with a source of fluid pressure to power the linear actuator, such as a pump motor, as well as being provided with controls, or valving, to selectively provide fluid pressure, or release pressure to each of the ports as needed, and thereby facilitate controlled movement of either or both of the first and second pistons 60, 80 within cylinder barrel 20. In an embodiment, the linear actuator may feature a plurality of fluid ports, identified in FIGS. 2-5 as ports 28, 30, 32. Pressurized fluid, such as hydraulic fluid, may be selectively introduced into, or evacuated from, the respective chambers through any one or more of the ports, and the resulting pressure change within each of the chambers will act upon the respective pistons within the cylinder barrel to cause the movement of the pistons laterally along part of the barrel interior passage, the internal lumen passage 18, with the first piston movement translated to the piston rod, and the second piston movement serving to selectively stop the first piston movement, as will be discussed. Each of the aforementioned ports 28, 30, 32 may be in fluid communication with a fluid within a fluid conduit, such as a hydraulic hose or line, via a suitable leak proof connection, with the interior of the fluid conduit also in fluid communication with at least one of a fluid reservoir, a source of fluid pressure, and/or a control system for controlling or distributing the pressure. In an embodiment, the fluid pressure source may be a fluid pump, capable of providing the volume and pressure of fluid to operate the steering and any other hydraulic actuators of the vehicle, as directed through a control system.

Figure 5:
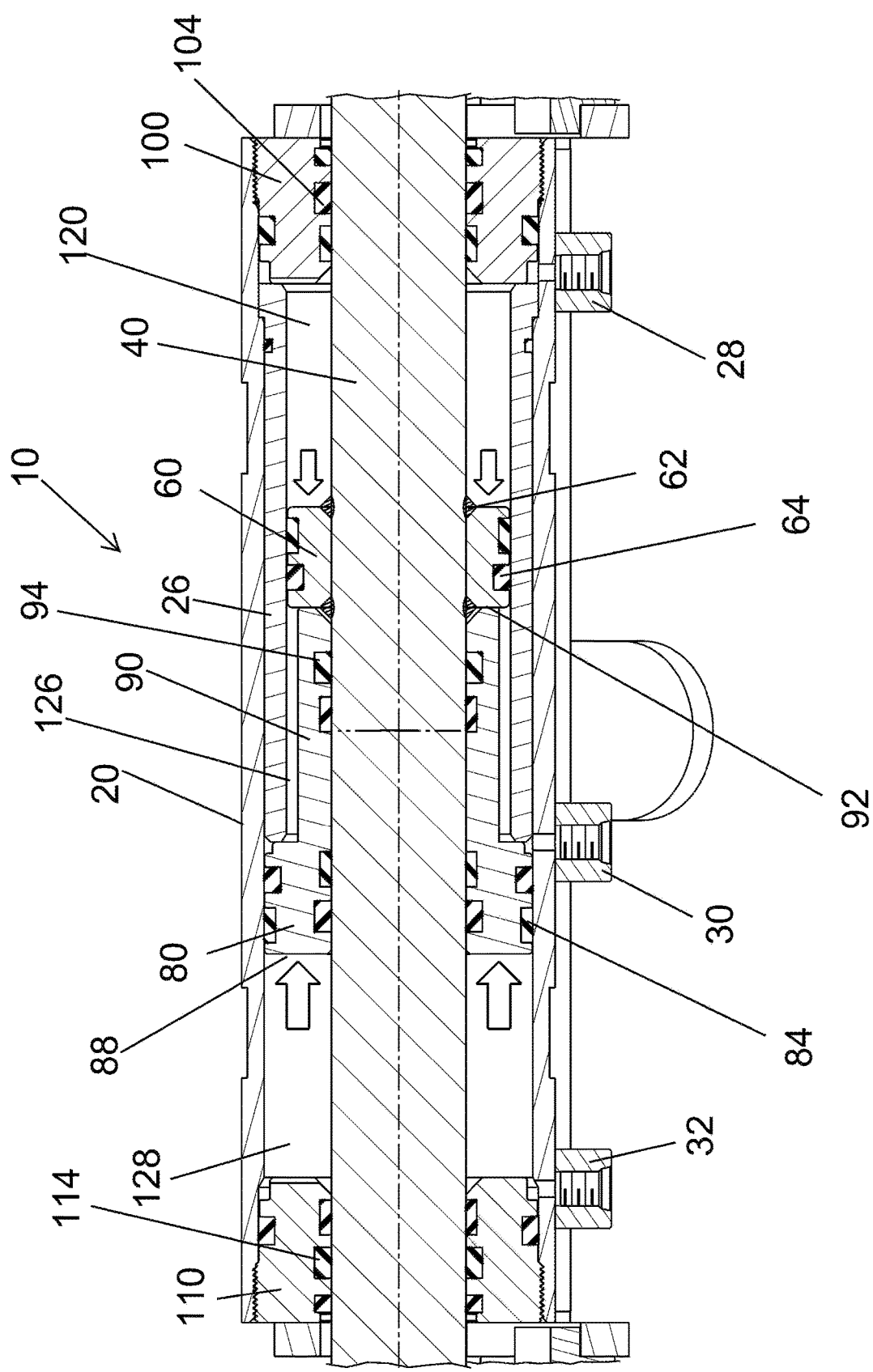
FIG. 5 is an enlarged cross-section view of a portion of the linear actuator of the steering assembly system of FIGS. 1A and B, with the direction of the steering urged into centered position.
Figure 11:
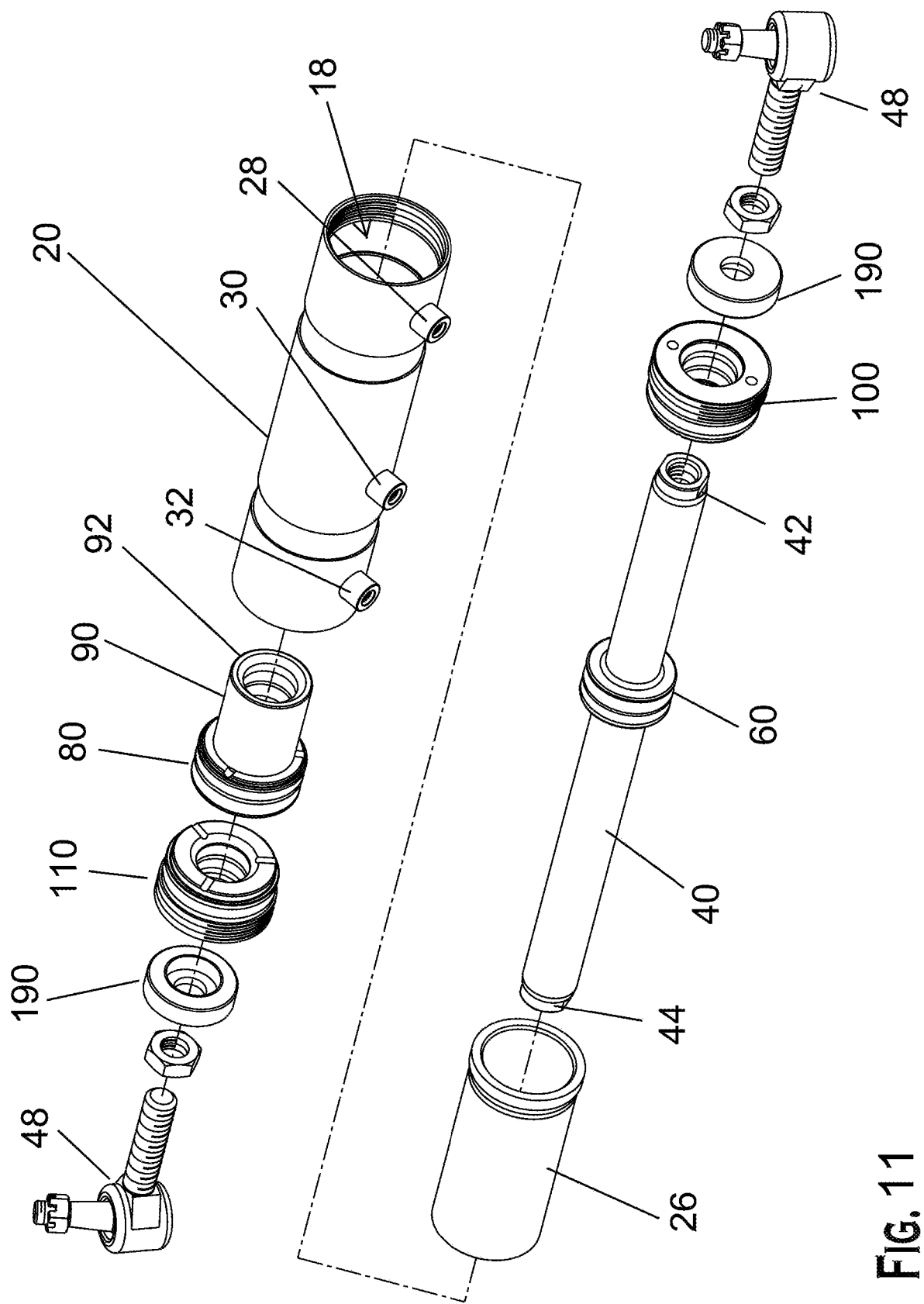
FIG. 11 is an exploded view of the components of the linear actuator.

As can be seen with reference to FIGS. 2 and 5, a piston rod 40 is extended longitudinally through the cylinder barrel 20, e.g., along the longitudinal axis of the cylinder barrel 20. The piston rod 40 has a first rod end 42 that is to protrude out of the cylinder barrel 20 through first cap 100 and out from first end of cylinder barrel. The piston rod 40 has a second rod end 44 that is to protrude out of the cylinder barrel 20 through the second cap 110 and out from the second end of the cylinder barrel 20. Each of the first and second rod ends may be provided with a securement means 46 at each end, which may be any suitable means by which the piston rod ends 42, 44 can be secured to the components that are to be actuated by the linear actuator, for example, the steering knuckles for each wheel on an axle. In an embodiment, the securement means 46 are in the form of a threaded end as depicted in FIG. 11, for example to accommodate securement of a ball joint 48 as depicted thereto. It is recognized that alternative forms of mechanical fixation may be utilized to secure the piston rod ends 42, 44 to the components to be actuated, as will be familiar to those of skill in the art. The securement means 46 at one or both ends of the piston rod 40 may additionally be provided with an end stop 190, as will be discussed.

With reference to FIG. 2, the first piston 60 is to be mechanically secured by at least one mechanical fixation 62, such as by welding or other suitable form of mechanical fixation, to fix the first piston to a location on the piston rod 40. The piston rod 40 and first piston 60, thus function as a combined unit, as can be seen in isolation in the exploded view of FIG. 11. In this manner, the as the first piston 60 is caused to reciprocate within its range of travel within the cylinder barrel 20, the piston rod 40 will be caused to move the same amount and in the same direction, slidingly reciprocating within the cylinder barrel 20. The first piston 60 is of an outside diameter that fits within dimension of smaller inside diameter portion 22 of cylinder barrel 20, with only slight tolerance that can form a sliding, fluid impermeable junction due to the placement of one or more first piston seals 64, in corresponding groove(s) oriented around the outside diameter of the first piston 60. Such seals and grooves to accommodate piston seals 64 are known to those of skill in the art, and thereby the first piston 60 seals to form pressure tight, yet slidable fitment within interior of cylinder barrel 20, for example, within sleeve 26. Such slidable junctions are as is known with other pressure driven actuators.

With reference to FIG. 2, the first piston 60 has first face 66 and second face 68, with the first face 66 oriented towards the first cap 100, and also towards the first chamber 120, and the second face 68 of the first piston 60 oriented towards the second cap 110, and also towards the second chamber 126.

The second piston 80 is depicted in FIG. 2, and in the exploded view of FIG. 11. The second piston 80 is slidably mounted on the piston rod 40, and is to be positioned between the first piston 60 and the second cap 110. As with the first piston, the second piston also has at least one seal 84 that is fitted into one or more corresponding grooves provided on the outside diameter of the second piston 80, in order to provide a sliding, fluid impermeable junction by the seal against the interior surface of the cylinder barrel 20. The second piston 80 is of an outside diameter that is larger than the diameter of the first piston 60. The second piston 80 has an outside diameter that fits within the dimensions of the larger inside diameter portion 24 of the cylinder barrel 20, only with slight tolerance that can form a sliding, fluid impermeable junction due to the placement of the one or more seals 84 around the second piston. The second piston is also provided with at least one seal groove provided on the interior diameter of the second piston 80, to accommodate an inside seal 84" that can provide a fluid impermeable, sliding seal against the outside surface of the piston rod 40.

The second piston 80 has a first face 86 oriented towards the first cap 100, and facing the second chamber 126. A standoff collar 90 extends from the first face 86 of the second piston 80, in a direction towards the first cap 100. The second piston 80 has a second face 88 that is oriented towards the second cap 110, and also facing the third chamber 128.

The first face 86 of the second piston 80 may be provided with grooves or passageways (e.g. radial striations) to accommodate fluid flow to the surface of the first face 86, even when the second piston 80 is tightly urged against the end of the sleeve 26. Similarly, the second face 88 of the second piston 80 may optionally be provided with a grooves or passageways (e.g., radial striations) to accommodate the flow of fluid to the surface of the second face 88, even when the second piston 80 is tightly urged against the second cap 110.

The standoff collar 90 is a cylindrical projection extending from the first face 86 of the second piston 80, in a direction towards the first piston 60. The standoff collar 90 may be mechanically secured (e.g. welding, threaded coupling) to the second piston 80, or alternatively, may be formed integral with the second piston 80 as a single unit. The standoff collar 90 has an internal bore to slidingly accommodate the piston rod 40 therethrough and may optionally be provided with internal grooves to accommodate one or more standoff seals 94, to slidingly seal against the surface of the piston rod 40. The outside diameter of the standoff collar 90 is less than the outside diameter of the first piston 60. The standoff collar 90 is of a length, such than when the second piston 80 is urged to its furthest point towards the second cap 110, the protruding end of the standoff collar terminates at a point where it will be generally aligned near the second port 30, and extend at least to the transition from the larger inside diameter portion 24 to the smaller inside diameter portion 22, or end of the sleeve 26, if present, within the cylinder barrel 20.

In an embodiment, the steering assembly system 1 is configured to provide Ackerman style steering for the axle, as will be familiar to those of skill in the art, which seeks to minimize tires slipping sideways as the vehicle navigates a turn. In such an embodiment, the linear actuator 10, when placing the wheels of the axle to a centered steering position for straight travel, would not be positioned with the first piston 60 centered within its travel range. To provide the Ackerman steering, it is contemplated that, when the steering assembly system 1 is provided in a straight travel configuration, the first piston 60 would be positioned at a point corresponding to between 55% and 69%, between 60% and 64%, or may be positioned at approximately 62% of the first piston travel range, where full lock steering in one direction corresponds to 0% of its travel range, and full lock steering in the other direction corresponds to 100% of the first piston travel range. One skilled in the art will recognize that varying the placement of the axle tie rod, and location of the steering knuckles will require varying the dimensions of the linear actuator, and adjustment to the travel range for either or both of the first piston 60 or second piston 80, in order to provide the desired steering performance for the steering assembly system 1, and such variations will be understood by those of skill in the art and fall within the spirit of this disclosure.

With reference to FIG. 5, the second piston 80 is located in a position where it has been fully urged in a direction away from the second end cap 110, with the second piston 80 being limited in travelling further by encountering the end of sleeve 26, and the standoff collar 90 can be seen to protrude into the length of the smaller inside diameter portion 22 of the cylinder barrel. In this position, the standoff collar 90 serves to limit the normal travel range of the first piston 60, as the first piston would encounter the stop end 92 of the standoff collar 90 if urged away from the first cap 100. As depicted, there should be a gap to allow for fluid flow between the outside surface of the standoff collar and the internal dimension of the sleeve 26, or reduced inside diameter portion 22 of the interior of the cylinder barrel 20, for all of the overlap between the standoff collar 90 and the reduced interior diameter portion 22 of the cylinder. In this manner, the second port 30 can remain in fluid communication with the second face 68 of the first piston 60, as the fluid is able to flow through the gap created (i.e., along the outside surface of the standoff collar 90, and inside of the reduced interior diameter portion 22 of the cylinder barrel 20). This allows the introduction, or release of pressurized fluid at second port 30, that can interact with the second face 68 of the first piston 60.

With reference to FIG. 5, the linear actuator can be seen to provide three fluid chambers, each respectively associated with one of the ports. The boundaries of each of these chambers will adjust as the first and second pistons 60, 80 are caused to move within their range of travel within the interior of the cylinder barrel 20. Thus, the chambers will adjust in volume as the pistons are caused to move, such as may be accomplished by controllably varying the pressures within each of the chambers using the hydraulic system and associated valving. The linear actuator as depicted provides a first chamber 120 associated with a first port 28, a second chamber 126 associated with a second port 30, and a third chamber 128 associated with a third port 32.

The first chamber 120 is in fluid communication with the first port 28. The first chamber corresponds to the fluid volume that is located within the region of the cylinder barrel 20 that is defined by the interior face of the first cap 100 and the first face 66 of the first piston 60.

The second chamber 126 is in fluid communication with the second port 30. The second chamber corresponds to the fluid volume that is located within the region of the cylinder barrel 20 that is defined by the second face 68 of the first piston 60 and the first face 86 of the second piston 80.

The third chamber 128 is in fluid communication with the third port 32. The third chamber corresponds to the fluid volume that is located within the region of the cylinder barrel 20 that is defined by the interior face of the second cap 110 and the second face 88 of the second piston 80.

The linear actuator 10 as described herein utilizes a plurality seals and or wipes to create fluid impermeable junctions between fluid containing components. Many of those seals must also allow for sliding movement of components, for example, at the junction between pistons and the interior surface of the cylinder barrel, or the junction between the caps 110, 110 and the piston rod 40. The sliding movement is characteristic of pressure driven actuators, such as the hydraulic cylinder embodiment shown, that rely on providing pressurized fluid selectively in one or more chambers within the device, to cause a directional movement of a component, for example, the first and second pistons 60, 80. Such seals utilized in the linear actuator 10 will be familiar to those of skill in the art, and include elastomeric O-rings that can be directed into seal grooves provided in the components, yet protrude at least slightly out of the groove to provide a surface that conforms against, and can slide against the corresponding component. Thus, the seals utilized with the various embodiments described herein are capable of sliding and/or wiping repeatedly across a polished surface with little wear, thereby serving to maintain the fluid pressure within the respective chamber while the fluid pressure manipulations results in movement of the components, as is known with traditional hydraulic and pneumatic actuators.

While the above description has largely referred to the actuator as being a hydraulic actuation, it is contemplated that alternative pressure driven actuators may be similarly employed, such as pneumatic actuators, as would be understood and will be familiar to those of skill in the art.

Locking Mechanism

Figure 6:
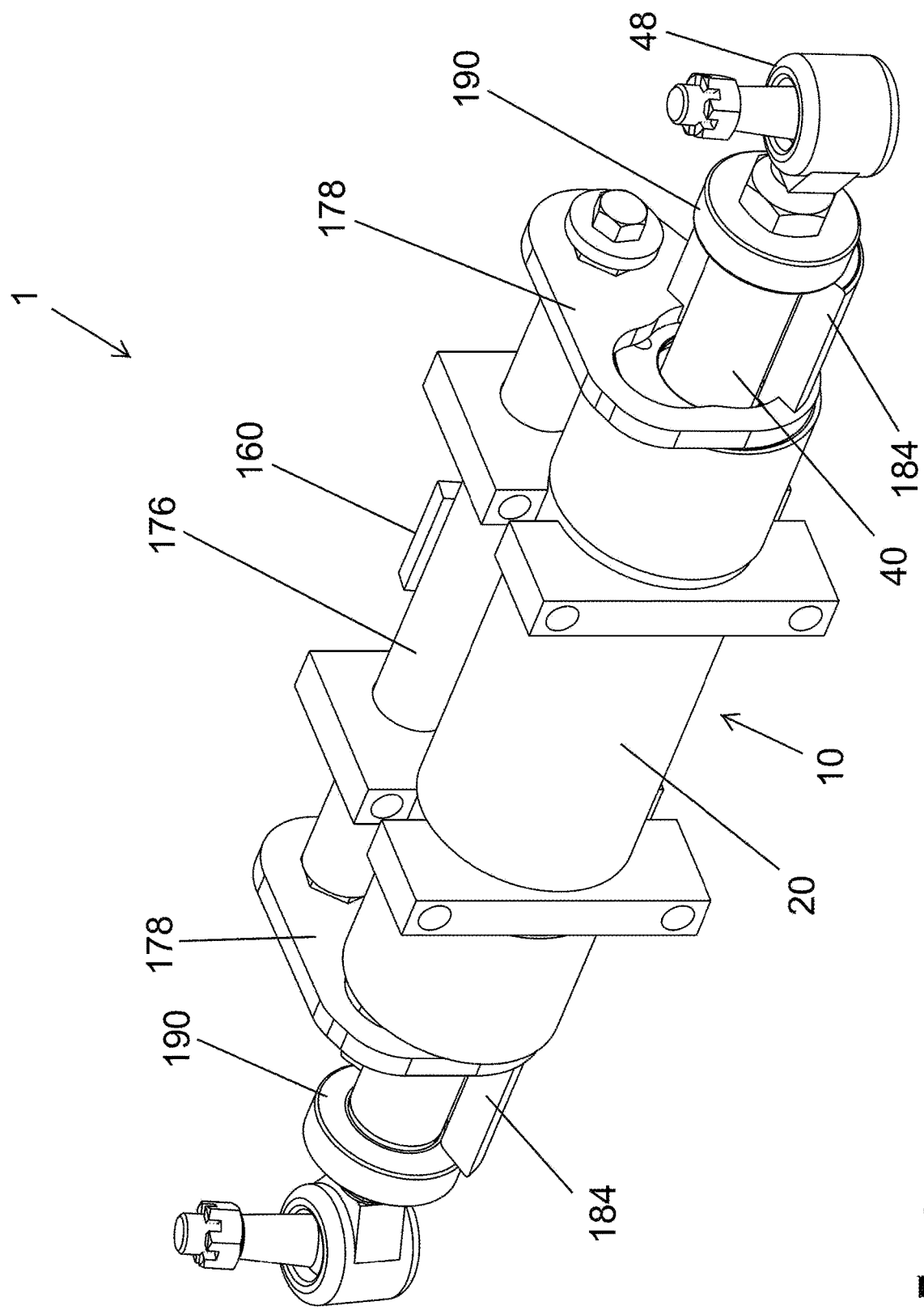
FIG. 6 is a perspective view of a steering assembly system according to the invention, with the mechanical lock deployed.

Referring to FIGS. 1B and 6, a locking mechanism 150 will be discussed. Typically, the locking mechanism 150 would be engaged only when the linear actuator is in a self-centering configuration, characterized by the position of the linear actuator 10 as shown in FIG. 5, though it is recognized that the locking mechanism may be capable of being engaged while the linear actuator is in a steering configuration, and the first piston of the linear actuator is positioned to center the steering of the axle. The depiction in FIG. 5 however, is preferred, as it ensures the positive positioning of the components ensure that the locking mechanism engages smoothly.

The locking mechanism engagement can understood with reference to FIGS. 7-10, showing details of the locking mechanism as it is engaged and disengaged. The locking mechanism 150 comprises at least the following major components: a pivot rod 176, lever 160, plunger 170; a pair of side plates 178, a pair of locking tangs 184, and a pair of end stops 190.

Figure 8:
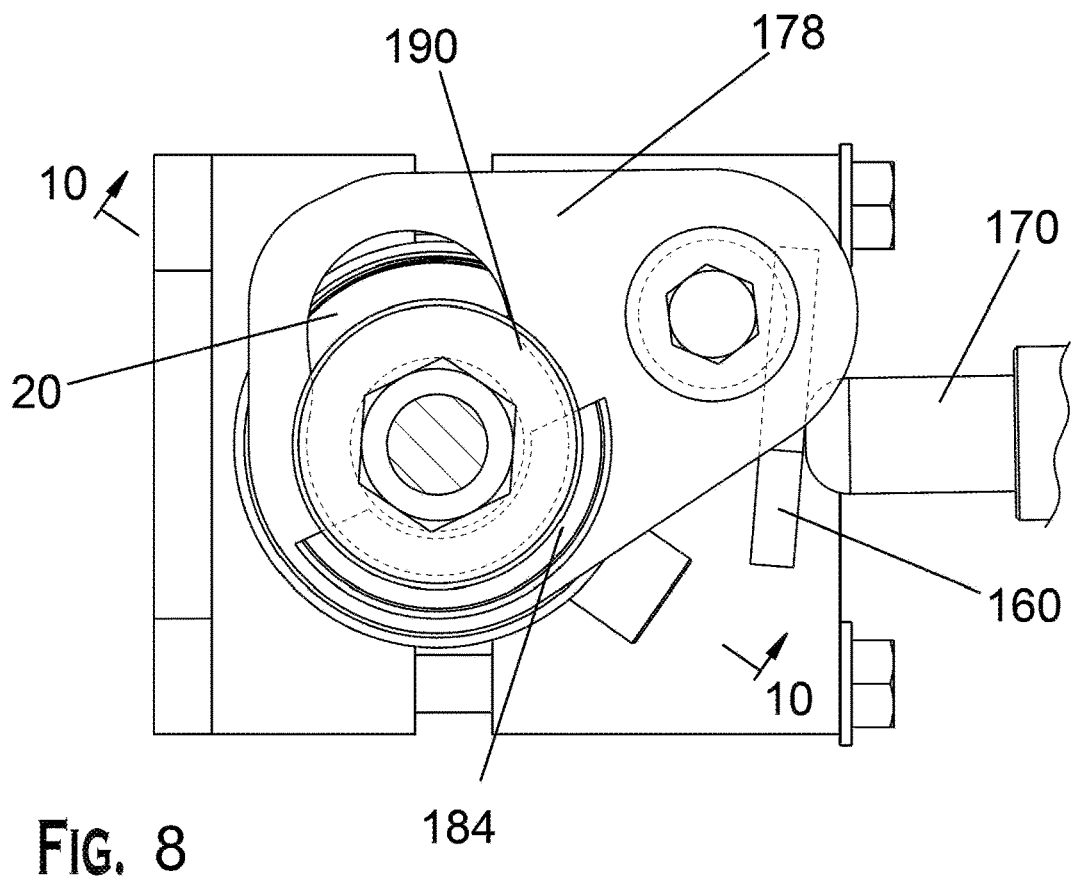
FIG. 8 is a side perspective view along a longitudinal axis of the linear actuator, with the mechanical lock deployed.
Figure 7:
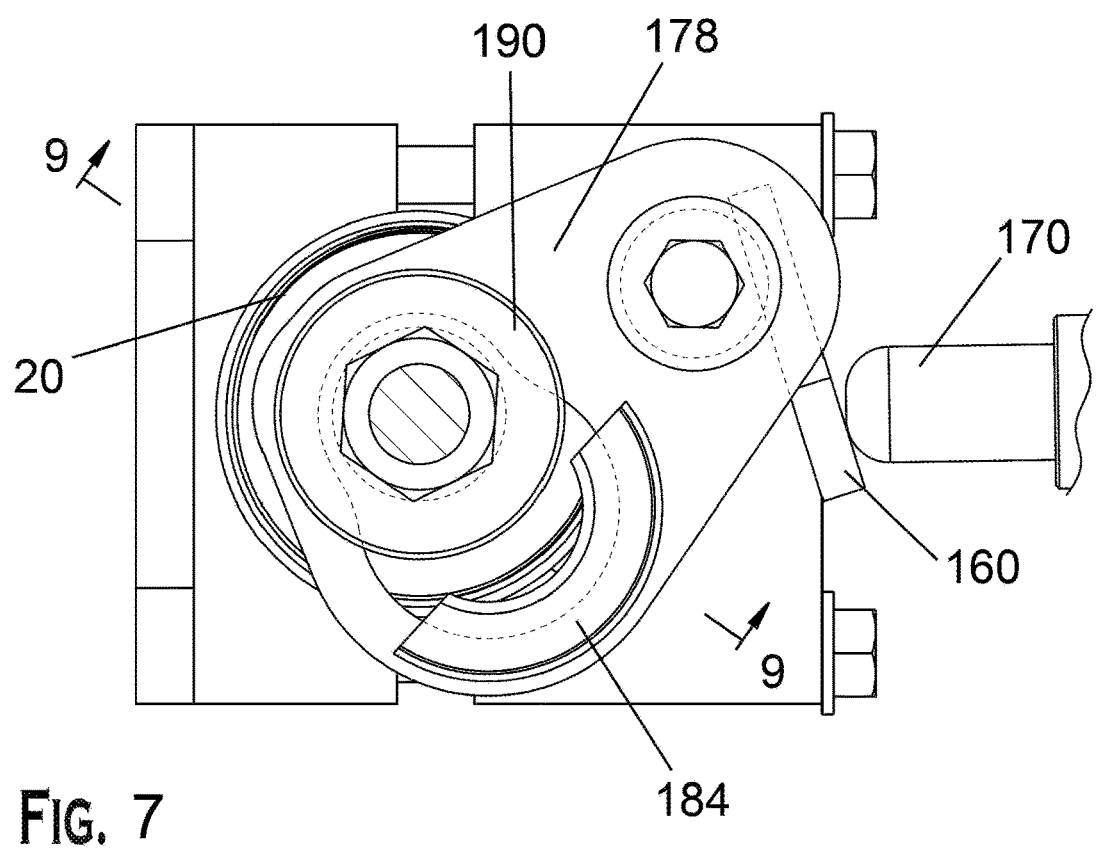
FIG. 7 is a side perspective view along a longitudinal axis of the linear actuator, with the mechanical lock retracted.

The locking mechanism may be actuated in any suitable manner according to the teachings below, and may be triggered through any suitable manner, for example, by any of electronically, hydraulically, mechanically, or manually. As can be seen with reference to FIG. 7 depicting the locking mechanism in a disengaged state, and FIG. 8 depicting the locking mechanism when engaged; actuation of the locking mechanism occurs by causing plunger 170 to be advanced in a direction towards the free end of lever 160. In an embodiment, the plunger is actuated manually, and may be similar to the operation of a barrel bolt latch, or may be actuated mechanically, where the action of the plunger is a result of mechanical interactions with other components of the vehicle. In an embodiment, the plunger may be operated electronically by a solenoid, or other electromechanical deployment. The lever 160 is mechanically secured to a pivot rod 176 that is configured to pivot about the longitudinal axis of the pivot rod as the lever 160 is actuated.

The locking mechanism 150 utilizes a pivot rod 176 that has at each end a side plate 178 mechanically secured thereto. As the pivot rod 176 is caused to pivot about its axis, the side plates 178 will also rotate about the longitudinal axis of the pivot rod. The side plates 178 are fixedly mounted with respect to the pivot rod 176, such that the side plates will rotate in unison with the pivot rod as it is caused to pivot. In an embodiment, the mounting of the side plates 178 to the pivot rod 176 may utilize a keyed connection, to prevent the side plate from moving independently from the pivot rod. Each of the side plates 178 have an opening to pass the piston rod 40 therethrough, and sized to allow rotational movement of the side plates 178 relative to the piston rod end 44.

The locking mechanism 150 provides a locking tang 184 located at the end of each of the side plates 178, on the end away from the mounting with the pivot rod 176. The locking tangs are mechanically secured to the side plate, and extends away from the side plate, as can be seen in FIG. 1B, and viewed along the longitudinal axis of the piston rod, in FIGS. 7 and 8. Each of the locking tangs 184 may be formed as an arc of a cylinder, such that the locking tangs 184 can each be caused to reversibly fit against the piston rod 40.

The locking mechanism 150 provides an end stop 190 for each of the piston rod ends 42, 44, with the end stops 190 in a position generally adjacent to the securement means 46, such as ball joints 48. The end stops are generally disc shaped, though may have a conical inside surface, as can be seen with reference to FIGS. 9 and 10.

Figure 9:
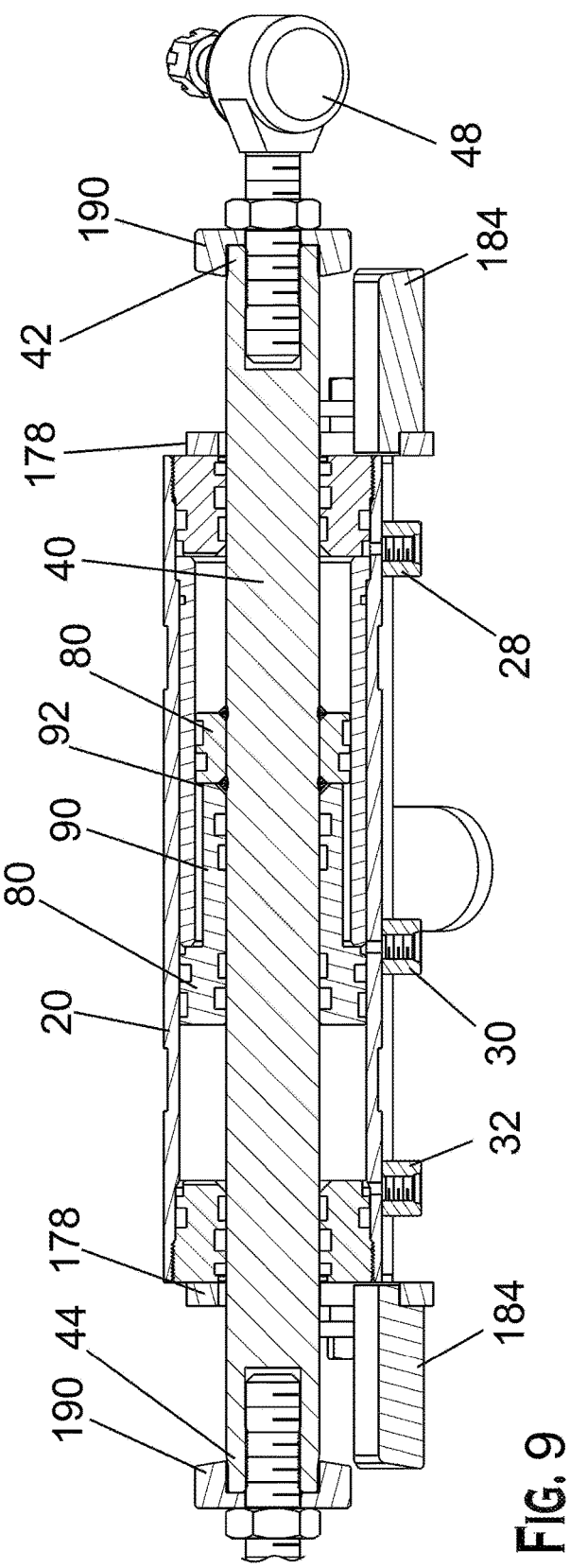
FIG. 9 is a cross-section view along line 9-9 of FIG. 7.
Figure 10:
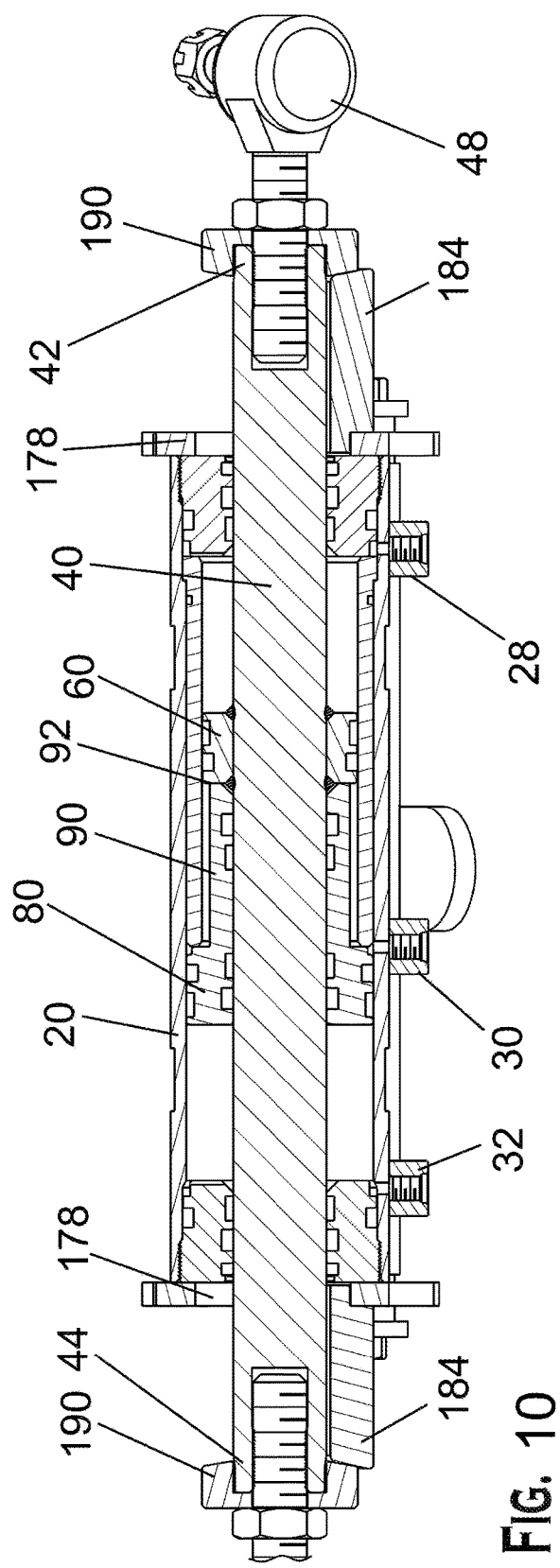
FIG. 10 is a cross-section view along line 10-10 of FIG. 8.

The locking tangs 184 are sized and positioned such that when the locking mechanism 150 is placed into a locking position, the locking tangs 184 will interfere with the lateral movement of the piston rod 40, and the end stops 190 located at the end of the piston rod 40, as can be seen in detail comparing the cross-section views of FIGS. 9 and 10. In an embodiment, the free ends of the locking tangs are slanted away from vertical, in opposite directions at either side of the cylinder barrel 20, at an angle corresponding to the conical surface of the end stops 190. Thus, the slanted surfaces ensure that there is increasing engagement between the locking tangs 184, and the end stops 190, as the pivot rod 176 is pivoted to bring the locking tangs closer to the piston rod 40. In this manner, the locking mechanism will be caused to more securely hold the piston rod in the centered position, the more that the locking mechanism is engaged, and urging the locking tangs closer to the piston rod.

The locking mechanism 150 can be reversed by retracting the plunger 170 from the lever 160, and allowing the pivot rod to pivot in the reversed direction, whereupon the side plates 178, and correspondingly, the locking tangs 184 will be caused to rotate with the pivot of the pivot rod 176. The locking tangs 184 will be caused to disengage from the end stops 190, such that free movement of the piston rod 40 is again possible, as the locking tangs 184 would be removed from interfering with the movement of the end stops 190 while the locking mechanism 150 is fully disengaged.

The use of an exemplary embodiment of a steering assembly system 1 according to the invention will now be described with reference to FIGS. 1-10.

In general, as is known with conventional pressure driven actuators, fluid delivery manipulations within a cylinder barrel can be used to create pressure differences between opposing sides of a piston, and the unbalanced pressures can be used to control the movement of that piston within the barrel. In the embodiments of the steering assembly system 1 described herein, pressure adjustments and the resulting fluid movement within the fluid (hydraulic or pneumatic) system will selectively cause one or both of the first piston 60 and the second piston 80 within the cylinder barrel 20 to be controllably actuated within their respective range of travel. Such a linear actuator 10 may usefully be employed in, for example, steering applications for a vehicle, where the linear actuator 10 can be actuated to cause lateral movement of the piston rod 40, along the longitudinal axis of the cylinder barrel 20, as the first piston 60 is moved within its range of travel, and thereby creating a steering action for that axle. By controlling a position of the second piston 80 within the cylinder barrel 20, the system can provide a stop that can be used to limit the travel of the first piston 60 at a point where the actuator will place the axle in a steering configuration for straight travel. By selectively opening and closing valves of the pressurized fluid system, the fluid pressures within the system can be configured in at least the following representative scenarios.

Delivery of fluid under pressure through first port 28 results in an increase of pressure within the first chamber 120, generally located between the inside surface of the first cap 100 and the first face 66 of the first piston 60. Conversely, the fluid within the first chamber 120 can escape or be released through first port 28, if the fluid line connected to the first port is depressurized, such as by opening the valve to allow release of fluid from the first chamber.

Delivery of fluid under pressure through the second port 30 results in an increase of pressure within the second chamber 126, generally located between the second face 68 of the first piston 60, and the first face 86 of the second piston 80. Conversely, the fluid within the second chamber 126 can escape or be released through the second port, if the fluid line to the second port is depressurized, such as by opening the valve to allow release of fluid from the second chamber.

Delivery of fluid under pressure through third port 32 results in an increase of pressure within the third chamber 128, generally located between the second face 88 of the second piston 80 and the inside surface of the second cap 110. Conversely, the fluid within the third chamber 128 can escape or be released through third port 32, if the fluid line to the third port is depressurized, such as by opening the valve to allow release of fluid from the third chamber.

In operation, while the steering assembly system 1 is introducing pressurized fluid into any one of the ports 28, 30, 32 on the cylinder barrel 20, and thereby causing an increase in the relative pressure of the respective chamber 120, 126, 128 on one side of the respective pistons 60, 80, the system will open the appropriate valve at the corresponding port for the chamber located on the opposite side of that piston to allow relief of pressure and allow the fluid to escape. In this manner, manipulation of the relative pressures in the chambers on either side of any of the pistons can be controlled to provide for controlled movement of that piston within its travel range. Thus, increasing the pressure in the first chamber 120, and simultaneously allowing the escape of fluid from the second chamber 126 will result in the first piston 60 travelling away from the first cap 100, as the volume of the first chamber increases and the volume of the second chamber decreases. Similarly, introducing pressurized fluid into the third chamber 128, and simultaneously allowing the escape of fluid from the second chamber 126 will result in the second piston 80 travelling away from the second cap, as the volume of the third chamber increases and the volume of the second chamber decreases. The movement of each of the first piston 60 and second piston 80 can be reversed by increasing the pressure in the second chamber 126, and simultaneously allowing the release of fluid from the first chamber 120 in order to cause the first piston 60 to travel towards the first cap 100; and/or allowing the release of fluid from the third chamber 128 in order to cause the second piston 80 to travel towards the second cap 110. The valve mechanism and controls for manipulating the flows and pressures within hydraulic system will be understood by those of skill in the art.

Generally, the positioning of the second piston 80 can be caused to move between a first and second position, located at the ends of the travel range for the second piston, as can be seen comparing the relative positions of the second piston 80 in FIG. 2 to that shown in FIG. 5. The range of travel of the second piston 80 within the cylinder barrel 20 will correspond with the larger inside diameter portion 24 of the cylinder barrel 20. The positioning of the second piston 80 will determine if the steering assembly system 1 is operating in a steering configuration, or in the self-centering configuration. The second piston 80, when positioned as shown in any of FIGS. 2-4, allows full steering range for the first piston 60, thus the steering assembly system 1 is depicted in steering configuration. The second piston 80, when positioned as shown in FIG. 5, prohibits the first piston 60 from travelling over its full steering range, thus the steering assembly system 1 is depicted in a self-centering configuration.

While it is possible to place the second piston at any position within its range of travel, it is anticipated that the second piston would ordinarily be urged to its full travel extent in either direction during use, in order to either allow full steering capability, or provide a stop for centered steering in the self-centering configuration. It is recognized however that the user may choose to control the pressures and fluid within the second chamber 126 and third chamber 128, and place the second piston 80 at a point along the second piston travel range that is not at either the first or second limits of the second piston travel range (e.g. mid-stroke for the second piston). This would have the effect of placing the stop end 92 of the standoff collar 90 in a position that would halt the first piston 60 prior to reaching its ordinary travel range in the steering configuration, but not at a point where the steering is centered. Such positioning may be employed to provide uneven directional steering, for example to minimize the extent of steering angle that can be applied through the system in one direction.

The steering and self-centering configurations will be further described below.

Steering Configuration

While the steering assembly system 1 is in a steering configuration, the first piston 60 will be capable of traversing through the entire travel range of the first piston, corresponding to traversing the length of the smaller inside diameter portion 22 of the cylinder barrel 20. The travel range of the first piston 60 can be observed by comparing the relative positions of the first piston 60 in FIG. 3 (with relatively higher pressure provided within the second chamber 126 through second port 30, and simultaneously providing relatively lower pressure and allowing fluid escape from the first chamber 120 through first port 28) to that shown in FIG. 4 (with relatively higher pressure provided within the first chamber 120 through first port 28, and simultaneously providing relatively lower pressure and allowing fluid escape from the second chamber 126 through second port 30). In this manner, the piston rod 40 will similarly be caused to traverse laterally through the cylinder barrel 20, urged by pressure differentials acting on opposite sides of the first piston 60, to allow full steering capability of the axle, as the piston rod ends 42, 44 may be attached to steering knuckles for a vehicle.

Figure 3:
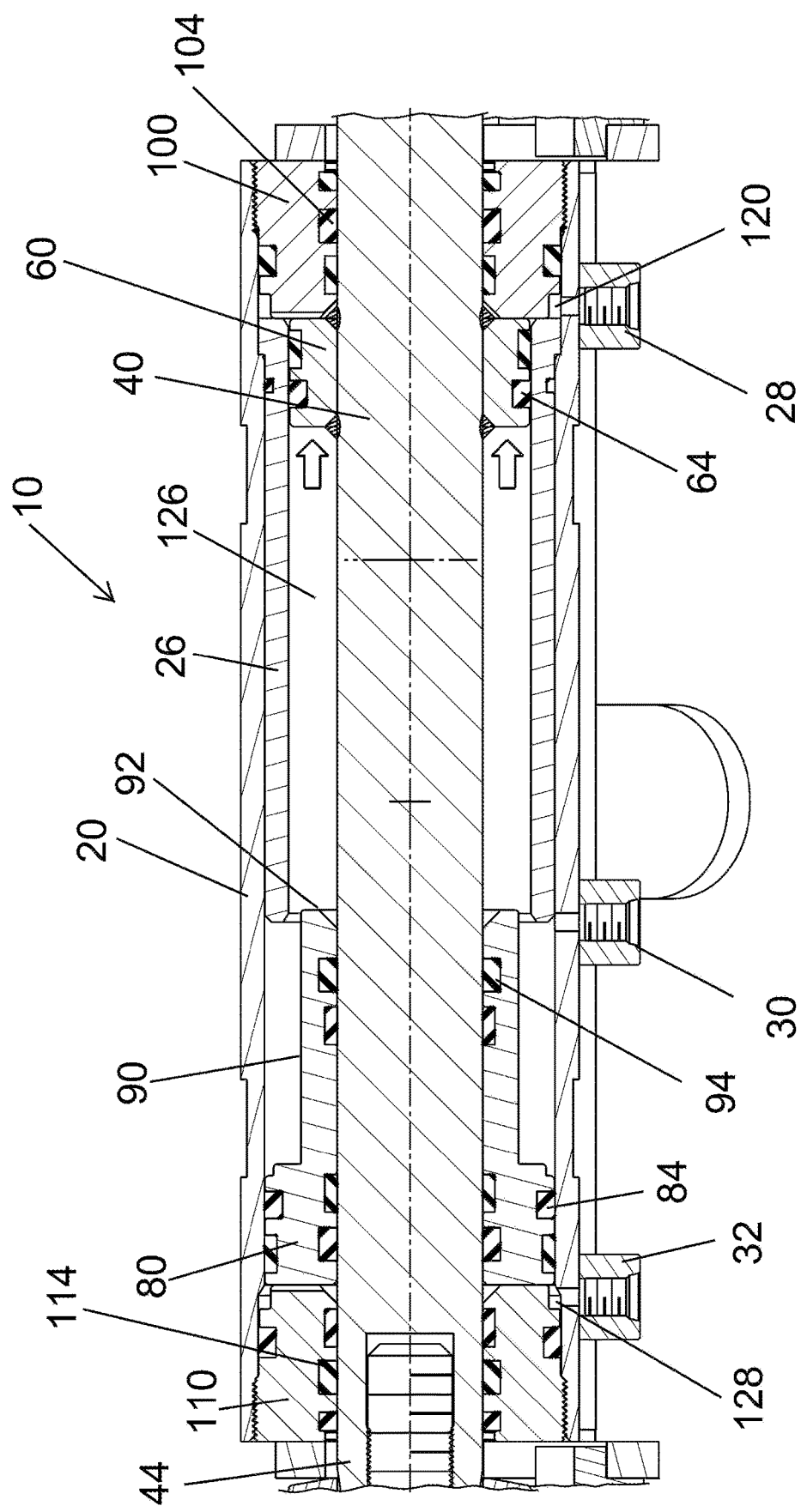
FIG. 3 is an enlarged cross-section view of a portion of the linear actuator of the steering assembly system of FIGS. 1A and B, with the direction of the steering urged into full lock in a first direction.
Figure 4:
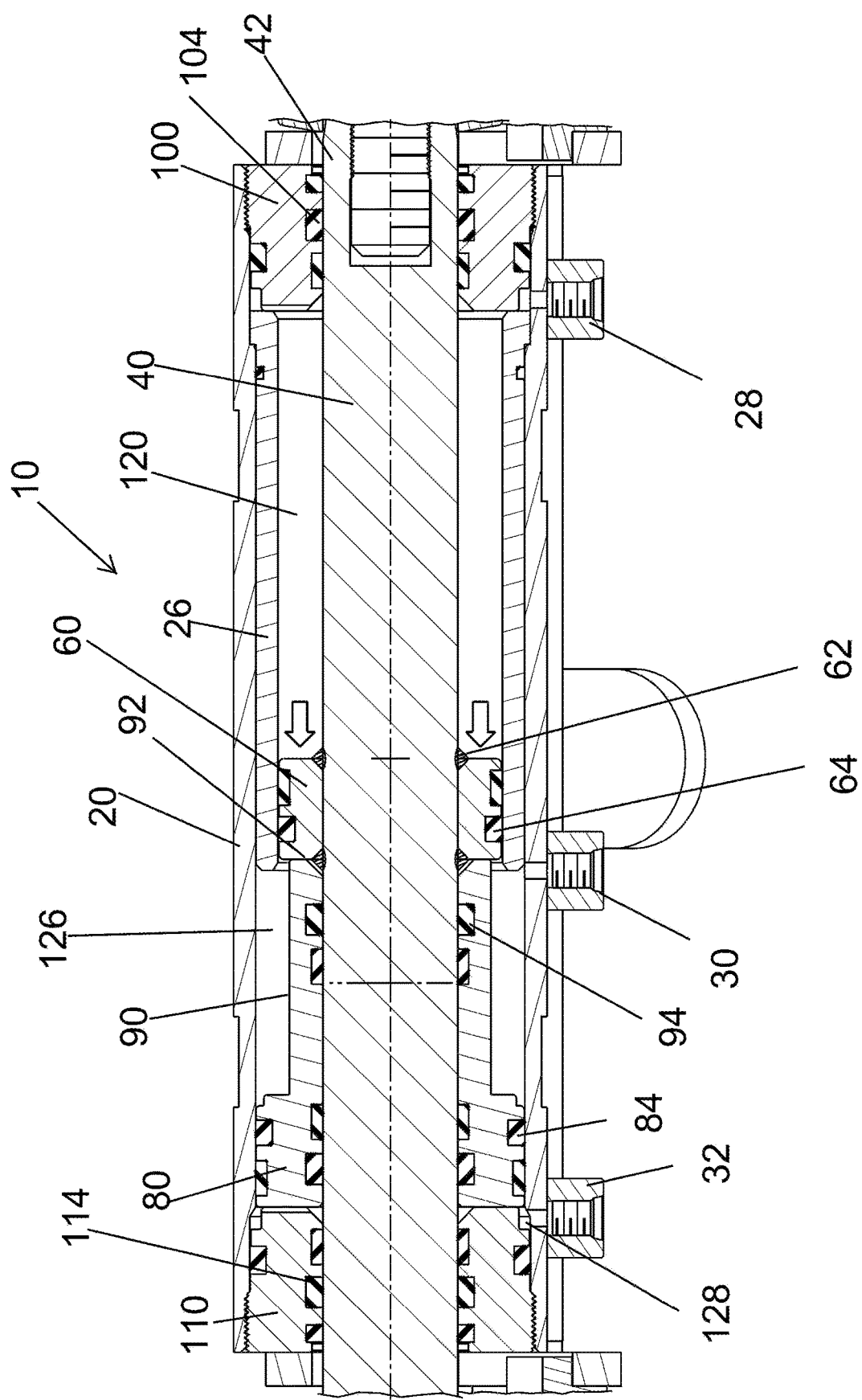
FIG. 4 is an enlarged cross-section view of a portion of the linear actuator of the steering assembly system of FIGS. 1A and B, with the direction of the steering urged into full lock in a second direction.

For example, by selectively varying the relative pressures applied to the first face 66 of the first piston 60, by introducing elevated fluid pressure through first port 28, thereby increasing the pressure in the first chamber 120 higher than the pressure in the second chamber 126, such that fluid is caused to exit from the second chamber 126, the first piston 60 would be urged away from the first cap 100, and continued movement would place the first piston into the position shown in FIG. 4, placing the steering of that axle at full lock in a first direction. The movement of the first piston 60 can be reversed by selectively introducing higher fluid pressure in the second chamber 126 through second port 30, and simultaneously reducing the fluid pressure, and allowing release of pressurized fluid from the first chamber 120, whereupon the first piston 60 would be urged in a direction towards the first cap 100, and continued movement would place the first piston into the position shown in FIG. 3, placing the steering of the axle at full lock in an opposite direction. FIG. 2 depicts the first piston 60 at approximately the midpoint of its travel range, while in the steering configuration. If the pressures on either side of the first piston are maintained at equal relative levels, the first piston would not be urged to move in either direction, furthermore, where the fluid in each chamber is prevented from escaping of the respective port, the first piston 60 would resist movement, as the fluid within the chamber is at a set volume, and would be resistant to being compressed. This effect would be greater in a hydraulic fluid system, as the fluid tends to be incompressible, whereas a pneumatic system may be more susceptible to compression of the gas contained within the respective chambers.

In this manner, the steering assembly system 1 can manipulate the pressures and flows in the first and second chambers to direct the movement of the piston rod 40 within the cylinder barrel 20, through a normal travel range of the first piston 60. The range of travel of the first piston 60 within the cylinder barrel 20 will generally correspond with the length of smaller inside diameter portion 22 of the cylinder barrel 20.

As can be seen with reference to FIGS. 3 and 4, the first piston 60 travel range extends between the points at which the first piston 60 can travel when the linear actuator 10 is configured in the steering mode, which is characterized by having the second piston 80 at the end of its travel range by being urged fully to rest against the inner face of the second cap 110. So long as the second piston 80 remains in the self-steering position, then the first piston 60 can controllably be directed to travel through the entire range of travel, or any point therebetween, by utilizing the valve control to selectively to deliver and release the pressurized fluid from the first and second chambers 120, 126, which then can push upon the first and second faces 66, 68 of the first piston 60, respectively, to cause movement of the first piston through its travel range.

The second piston 80, while remaining in the self-steering position shown in FIGS. 2-4, will place the stop end 92 of the standoff collar 90 at a point that is generally aligned with the second port 30, or extends slightly past the second port, and serves as stop to prevent the first piston 60 from occluding the second port 30.

The piston rod ends 42, 44 if attached to other components, and the cylinder barrel 20 mechanically secured in a fixed position, can then perform work, and cause the movement of the components as the first piston 60 is actuated over its travel range within the cylinder barrel 20. For example, if the piston rod ends 42, 44 are attached to steering components, e.g., steering knuckles, and the cylinder barrel 20 is secured in position relative to the axle or frame of the vehicle, the movement of the first piston 60 can thereby provide directional steering to an axle of a vehicle.

So long as the pressure in the third chamber 128 is maintained to be lower than the pressures in at least one of the first and second chambers 120, 126, the steering assembly system 1 can selectively adjust the pressures in the first or second chambers to allow the first piston 60 to travel within the full length of the first piston's travel range. In this manner, the system can be utilized, for example, as a steering cylinder for an axle of a vehicle.

While in the steering mode, the steering assembly system 1 may apply increased pressure and introduce fluid into the first chamber 120 through the first port 28, and will cause the first piston 60 to be urged away from the first cap 100, as the increased pressure acts to push on the first face 66 of the first piston 60. While the first piston 60 is urged in a direction away from the first cap 100, fluid may be released from the second chamber 126.

Conversely, while remaining in the steering mode, the steering assembly system 1 may apply increased pressure and introduce fluid into the second chamber 126 through the second port 30, and will cause the first piston 60 to be urged toward the first cap 100, as the increased pressure acts to push on the second face 68 of the first piston 60. While the first piston 60 is urged in a direction towards the first cap 100, fluid may be released from the first chamber 120.

Self-Centering Configuration

The linear actuator can be placed into the self-centering configuration as shown in FIG. 5, by controlling the introduction and release of pressurized fluids, as has been described previously, to cause the second piston 80 to move away from the second cap 110, and into the depicted position. To provide the second piston 80 in the shown position, pressurized fluid has been introduced into the third chamber 128, and simultaneously reducing pressure and allowing the fluid to exit from the second chamber 126. The second piston 80 will then be urged away from the second cap 110 and can continue travelling until the second piston is limited in its travel as it encounters the transition from the larger inside diameter portion 24 to the smaller inside diameter portion 22 within the cylinder barrel 20. As shown, the standoff collar 90 extends from the first face 86 of the second piston 80, such that it will be positioned within the region of the smaller inside diameter portion 24 of the cylinder barrel 20, or the sleeve 26, if present. Furthermore, to place the linear actuator 10 in a straight travel position for the self-centering configuration, pressurized fluid should also be directed into the first chamber 120, whereupon the first piston 60 will be caused to travel in a direction away from the first cap 100, until the second face 68 of the first piston 60 encounters the stop end 92 of the standoff collar 90 when the second piston 80 is in the position shown in FIG. 5, having been urged fully in the direction away from the second cap 110, until encountering the transition of the inner diameter of the barrel from the smaller diameter portion 22 to the larger diameter portion 24.

When the second piston 80 is urged in a direction away from the second cap 110, by introducing pressurized fluid into the third chamber 128, at a pressure that is higher than in the second chamber 126, and allowing the fluid within the second chamber 126 to escape, the second piston 80 will be urged in a direction away from the second cap 110 until the first face 86 of the second piston 80 is residing against the sleeve 26 if present, or encounters the transition into the smaller inside diameter portion 22 of the cylinder barrel 20, as the second piston 80 is sized to not be able to enter the smaller inside diameter portion 22 of the cylinder barrel 20. In this configuration, the stop end 92 of the standoff collar 90 attached to the second piston 80 will be positioned at a point located between the first and second ports 28, 30, and will thereby serve as a stop to prevent the first piston 60 from being able to travel over its normal full range of travel, as the first piston 60 would encounter the stop end 92, were the first piston 60 urged in a direction away from the first cap 100.

To place and maintain the cylinder in a self-centering mode, elevated pressure is provided such that fluid is introduced simultaneously to the first chamber 120 through the fluid line connected to first port 28, as well as to the third chamber 128 through the fluid line connected to third port 32; while providing a relatively lower pressure in the second chamber 126 through port 30, and allowing the escape of fluid from the second chamber. In this configuration, the second piston 80 will be urged fully in a direction away from the second cap 110, until the second piston 80 encounters the transition to the smaller inside diameter portion 22 of the cylinder barrel 20, and simultaneously, the first piston 60 is urged in a direction away from the first cap 100, and resides against the stop end 92 of the standoff collar 90, as depicted in FIG. 5.

In an embodiment where the first chamber 120 and the third chamber 128 are pressurized from the same pressurized fluid source, the pressurized chambers would be expected to have the same relative pressures. In order to ensure that the linear actuator 10 remains in a self-centering configuration, the first piston 60 must not be able to apply force that would be in excess of the force applied in the opposite direction by the second piston 80, as to do so would result in the undesirable situation where the first piston 60 is able to override the resistance provided by the stop end 92 of the standoff collar 90. To avoid such an occurrence, in an embodiment, the system provides the second piston 80 with a larger surface area on the piston, such that the second face 88 that is acted upon by the pressure within the third chamber 128, and further the first piston 60 is provided with a relatively lesser surface area on the first face 66 that is acted upon by the first chamber 120. In this manner, even as the first and second pistons 60, 80 are respectively urged towards each other by the same level of fluid pressure in each of the respective chambers, ultimately, the larger second piston 80 will have a greater urging force than that of the first piston 60 owing to the greater surface area of the second piston 80 being acted upon. This ensures the steering assembly system 1 will be capable of remaining in the centered steering position, so long as the pressures are maintained.

Alternatively, it is contemplated that the steering assembly system 1 may be configured to provide a higher fluid pressure to the third chamber 128, compared to that provided to the first chamber 120, thus not relying solely on the different sizes of the first and second pistons 60, 80, to ensure that the urging force provided by the second piston 80 prevails over the force applied from the first piston 60, in order to ensure that the fluid pressure differential tends to maintain the linear actuator in the self-centering configuration.

In an embodiment, the system may further be provided with a mechanical locking mechanism 150, as described previously with reference to FIGS. 7-10. This locking system can be reversibly deployed, once the first and second pistons 60, 80 have been actuated as described above to place the steering assembly system 1 into the self-centering configuration. Such a mechanical lock system 150 may then be engaged to maintain the relative positions of the linear actuator 10 components, even in the absence of fluid pressures being delivered through the fluid lines and into the respective chambers 120, 126, 128. In this manner, the steering assembly system 1 may be securely maintained in a self-centering configuration mode when the source of pressurized fluid is powered down, for example, during transport, or towing of the vehicle.

By controlling the geometry of the steering assembly for the axle, and the dimensions for the steering assembly system 1, such as the first piston 60 travel range, and the length of the standoff collar 90, or the length of the second piston 80 travel range, the pressures within the steering assembly system 1 can be adjusted to selectively allow full travel of the first piston 60 while in a steering configuration, or adjusted to limit the extent of travel of the first piston 60 at a point that the steering will be locked in a desired position to provide the straight orientation of the axle steering, in a self-centering configuration.

In order to transition out of the self-centering mode, and return to a steerable mode, the mechanical lock system 150 is disengaged, and the fluid pressure in the third chamber 128 is then reduced to be less than the pressures in either of the first or second chambers 120, 126, and the fluid allowed to escape from the third chamber 128 as the second piston 80 is moved over its range of travel until resting against the inner face of second cap 110. The steering may then be engaged by selectively increasing the pressure to delivery fluid in at least one of the first or second chambers 120, 126, at a pressure above the pressure remaining in the third chamber 128, and simultaneously allowing the release of fluid from the third chamber 128.

For example, applying a steering force to the first piston 60 by applying increased fluid pressure in the first chamber 120, and a relatively lower pressure in the third chamber 128 would cause the first piston 60 to move in a direction away from the first cap 100, and causing the first piston 60 to encounter the stop end 92 of the standoff collar 90. So long as the pressure in the first chamber 120 exceeds that in the third chamber 128, and the force applied by the first piston 60 exceeds the force applied by the second piston 80 in the opposite direction, the movement of the first piston 60 towards the second piston 80 will overcome the resistance provided by second piston 80 through the standoff collar 90. The first piston 60 will then push against the stop end 92 of the standoff collar 90, and force the second piston 80 towards the second cap 110, until the second face 88 of the second piston 80 is residing against the interior face of the second cap 110.

Alternatively, applying a steering force to the first piston 60 by applying increased fluid pressure in the second chamber 126, and a relatively lower pressure in third chamber would cause the first piston 60 to move in a direction towards the first cap 100, and additionally drive the second piston 80 in a direction towards the second cap 110, until the second piston 80 reaches the extent of its travel as described above.

It is further contemplated that increase fluid pressure may simultaneously be applied to the first and second chambers 120 and 126, respectively, and also lowered in the third chamber 128, whereupon the first piston 60 would be expected to remain generally in the same position, and the second piston 80 would be urged in a direction towards the second cap 110, to the end of the travel range of the second piston 80.

Once the second piston 80 is urged fully against the inner face of the second cap 110, the steering of the steering assembly system 1 can be effectuated by adjusting the pressures and fluid delivery into the first and second chambers 120 and 126, or selectively allowing the release of fluid therefrom, and causing the first piston 60 to reciprocate within its full range of travel, as has been described previously.

The foregoing illustrates some of the possibilities for practicing the invention. Many other embodiments and fields of use for the steering assembly system 1 are possible and within the scope and spirit of the invention. It is, therefore, intended that the foregoing description be regarded as illustrative rather than limiting.

What is claimed is:

1. A steering actuator comprising a double rod end cylinder having:
    a cylinder barrel having a sidewall, a first end with a first cap, and a second end with a second cap, and a first, second, and third fluid port, each formed in the sidewall, and each respectively in fluid communication with a first chamber, a second chamber, and a third chamber;
    a main piston rod having a first rod end and a second rod end with a length extending therebetween, and the first rod end extending through the first cap and the second rod end extending through the second cap of the cylinder barrel;
    a first piston having a first dimension and mechanically secured at a point along the length of the main piston rod; and
    a second piston having a second dimension larger than the first dimension of the first piston, and the main piston rod extending through at least the length of the cylinder barrel.

2. The steering actuator of claim 1, wherein the second piston has a standoff collar mechanically secured to a face of the second piston, the standoff collar extending in a direction towards the first piston, and having a stop-end.

3. The steering actuator of claim 2, wherein the cylinder barrel has a first portion with a small interior diameter sized to fit the first piston, and the cylinder barrel further has a second portion with a large diameter sized to fit the second piston, and a transition between the first portion and the second portion.

4. The steering actuator of claim 3, wherein the first portion further includes a sleeve inserted within the cylinder barrel to provide the small interior diameter.

5. The steering actuator of claim 3, wherein the first piston is configured to reciprocate within the first portion of the cylinder barrel, and the first piston separates the first chamber from the second chamber.

6. The steering actuator of claim 5, wherein the second piston is configured to reciprocate within the second portion of the cylinder barrel, and the second piston separates the second chamber from the third chamber.

7. The steering actuator of claim 6, wherein the second piston reciprocates between a steering mode position when the second piston is positioned adjacent to the second cap, and a self-centering mode position when the second piston is positioned adjacent to the transition.

8. The steering actuator of claim 7, wherein second piston, while in the steering mode position, does not prevent the first piston from traveling through a full range of travel for the first piston.

9. The steering actuator of claim 8, wherein the second piston while in the self-centering position, positions the stop end of the standoff collar at a location that obstructs the first piston from traveling through the full range of travel for the first piston.

10. The steering actuator of claim 9, wherein the second piston while in the self-centering position, and the first piston is placed against the stop end, will provide the double rod end cylinder in a centered steering position.

11. The steering actuator of claim 1, wherein the first piston and the second piston each have at least one seal capable of providing a fluid impermeable sliding junction with an internal surface of the cylinder barrel.

12. The steering actuator of claim 11, wherein the first cap, the second cap and the second piston each have at least one seal capable of providing a fluid impermeable sliding junction with an outside diameter of the main piston rod.

13. The steering actuator of claim 1, wherein the double rod end cylinder is pressure actuated, and is selected from one of a hydraulic cylinder and a pneumatic cylinder.

14. The steering actuator of claim 13, wherein the first rod end and the second rod end are each mechanically secured to steering components of an axle.

15. The steering actuator of claim 14, wherein the steering components are a steering knuckle, and the steering actuator provides directional steering for the axle of a vehicle.

16. The steering actuator of claim 15, further provides a source of fluid pressure, and valves to selective delivery fluid pressure to at least one of the first port, second port, and third ports.

17. The steering actuator of claim 16, wherein the cylinder barrel is mechanically secured to a vehicle, and the steering of the vehicle is provided by movement of the piston rod relative to the cylinder barrel.

18. The steering actuator of claim 1, wherein the steering actuator further includes a locking mechanism, the locking mechanism can engage and disengage, reversibly actuating to maintain the first piston and the second piston in a centered position.

* * * * *